(12) United States Patent
Bibeau (10) Patent No.: US 8,231,178 B2
(45) Date of Patent: Jul. 31, 2012

(54) MOBILE BASE FOR REDUCING LATERAL PRESSURE OF THE BODY LIFT CYLINDER OF A DUMP BODY

(75) Inventor: Marcel Bibeau, St. Felix-de-Valois (CA)

(73) Assignee: Les Placements Marcel Bibeau Inc., St-Felix-de-Valois, Quebec (CA)

( * ) Notice: Subject to any disclaimer, the term of this patent is extended or adjusted under 35 U.S.C. 154(b) by 214 days.

(21) Appl. No.: 12/706,189

(22) Filed: Feb. 16, 2010

(65) Prior Publication Data
US 2011/0198912 A1 Aug. 18, 2011

(51) Int. Cl.
*B60P 1/16* (2006.01)
*B60P 1/28* (2006.01)

(52) U.S. Cl. .............. 298/19 B; 298/19 R; 298/22 B; 298/22 D; 298/22 J (58) Field of Classification Search ............... 298/19 B, 298/19 R, 17 R, 23 B, 26, 17 B, 17 S, 23 TT, 298/17.5, 17.6
See application file for complete search history.

(56) References Cited

U.S. PATENT DOCUMENTS

| | | | | | |
|---|---|---|---|---|---|
| 2,509,911 | A | * | 5/1950 | Dore | 298/22 R |
| 2,603,518 | A | * | 7/1952 | Golay | 298/22 B |
| 2,620,225 | A | * | 12/1952 | Hutchinson | 298/22 D |
| 4,762,370 | A | * | 8/1988 | Corompt et al. | 298/19 R |
| 6,531,589 | B1 | * | 3/2003 | Iyer et al. | 536/25.31 |
| 6,976,740 | B1 | * | 12/2005 | Hollinrake et al. | 298/19 R |
| 7,523,994 | B2 | * | 4/2009 | Jones | 298/22 J |

FOREIGN PATENT DOCUMENTS

CA 2637639 A1 1/2010

* cited by examiner

*Primary Examiner* — Glenn Dayoan
*Assistant Examiner* — Sunsurraye Westbrook
(74) *Attorney, Agent, or Firm* — Fish & Richardson P.C.

(57) ABSTRACT

Disclosed is an equipment of the type comprising a frame on which is mounted a dump body liftable by means of a body lift cylinder having two opposite ends, a first one of these ends being connected to the frame and the other one to the dump body in order to lift it up when the cylinder is extended. This equipment is characterized in that the first end of the cylinder connected to the frame is mounted on a mobile base which is fixed onto the frame in such a manner as to have some liberty of transversal inclination and thus to allow the cylinder to extend in a constant straight line even if a lateral torsion is applied onto the cylinder by the dump body when said dump body is lifted up.

4 Claims, 14 Drawing Sheets

FIG. 1

(PRIOR ART)

FIG. 2

(PRIOR ART)

FIG. 3

(PRIOR ART)

MOBILE BASE FOR REDUCING LATERAL PRESSURE OF THE BODY LIFT CYLINDER OF A DUMP BODY

FIELD OF THE INVENTION

The present invention relates to a mobile base especially devised for reducing lateral pressure on a body lift cylinder.

More specifically, the invention relates to an equipment of the type comprising a frame on which is pivotably mounted a dump body liftable by means of a body lift cylinder, said cylinder being mounted onto the frame by means of a mobile base which is itself fixed to the frame in such a manner as to have some liberty of transversal inclination and thus to allow the cylinder to extend in a constant straight line even if a lateral torsion is applied onto the cylinder by the dump body when the same is lifted up.

Advantageously but not exclusively, said equipment is actually part of a truck or a trailer on which a dump body is pivotably mounted for the transportation and unloading of a charge.

TECHNOLOGICAL BACKGROUND

Equipment comprising a frame on which is pivotably mounted a dump body liftable by means of a body lift cylinder, are well known and commonly used. The problem that has always existed with this kind of equipment, is that there is no slack given to the body lift cylinder when the same is used for lifting up the dump body.

Therefore, when one wants to empty the dump body and the frame of the equipment, which is usually a truck or of any other vehicle, is not on a flat and straight surface, that is when both sides of the frame are not on the same level, and the angle of deflection applied to the dump body, is transmitted directly to the body lift cylinder when the same is extending to lift up the dump body. Then, a strong pressure can be exerted onto the inside or the outside of the body lift cylinder, which can lead to a problem of operation of the same, after some time.

Figure 1:
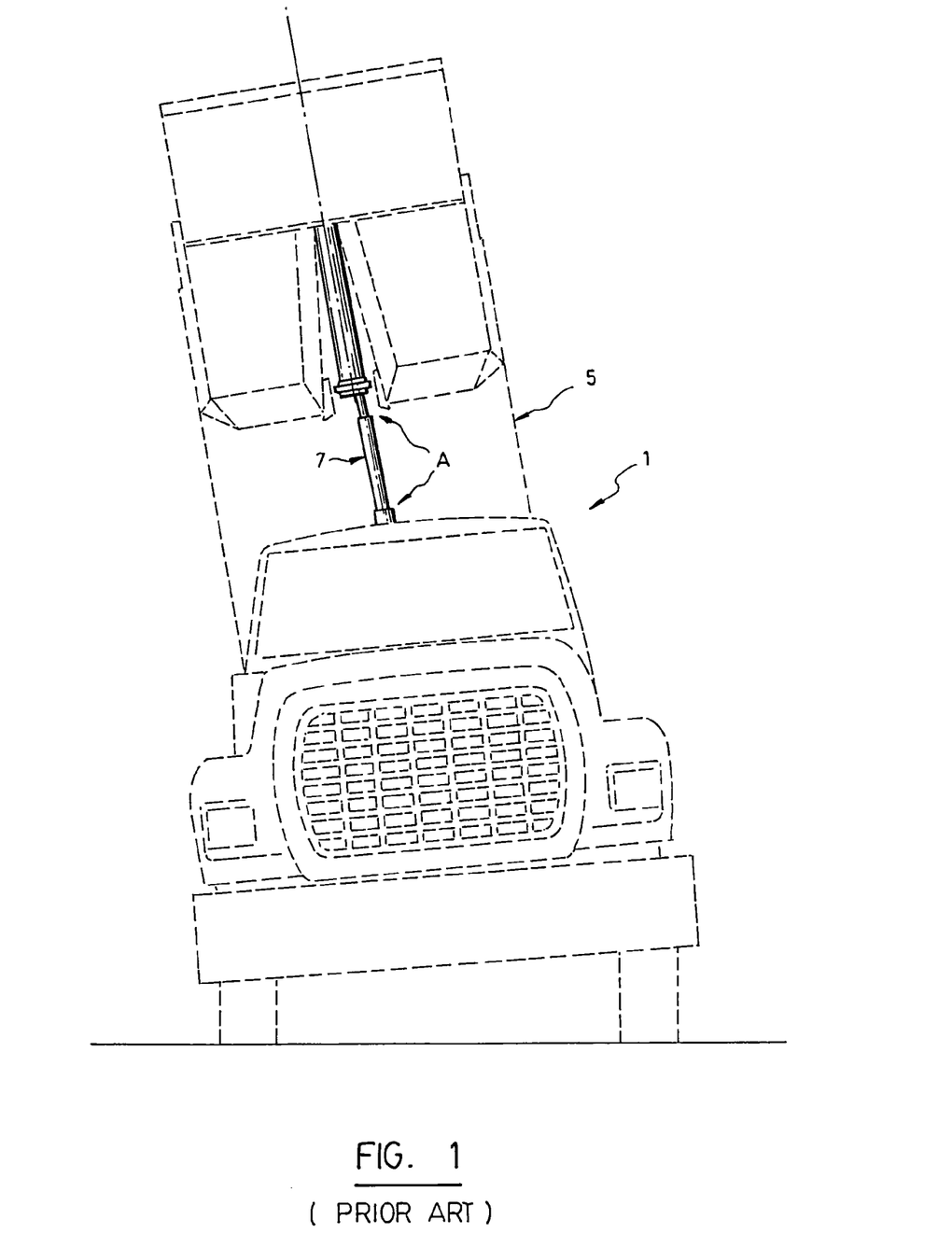
FIG. 1 identified as "PRIOR ART", is a front elevational view of a truck provided with a dump body in an upright position, showing the deformation that is applied to the body lift cylinder when the rear part of the truck and the dump body mounted on it, are inclined.
Figure 2:
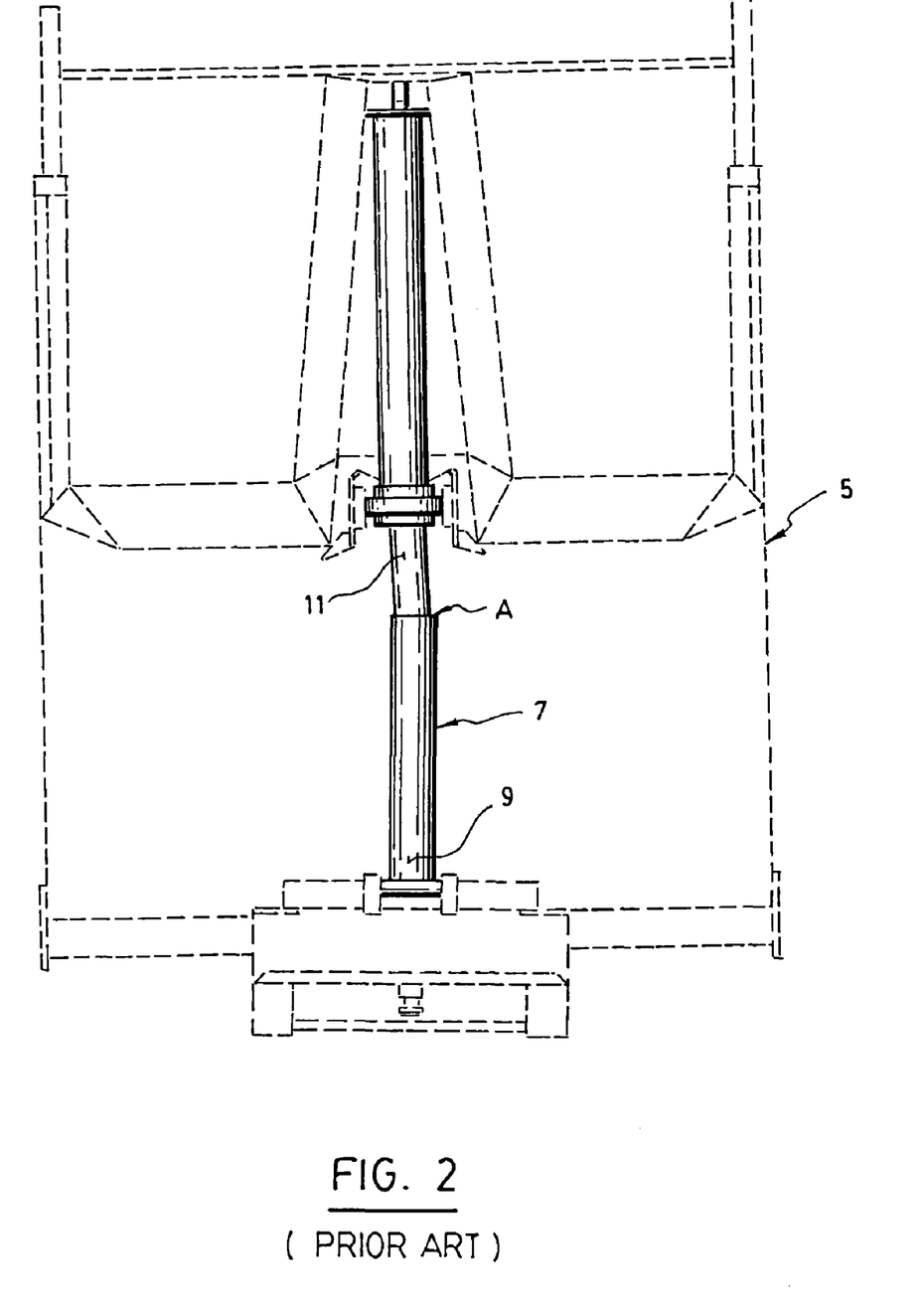
FIG. 2 identified as "PRIOR ART", is an elevational view of the body lift cylinder of the dump body illustrated in FIG. 1, showing that the cylinder, even when it is not yet fully extended, is already subject to a deformation between its connection base and the upper part of the dump body.
Figure 3:
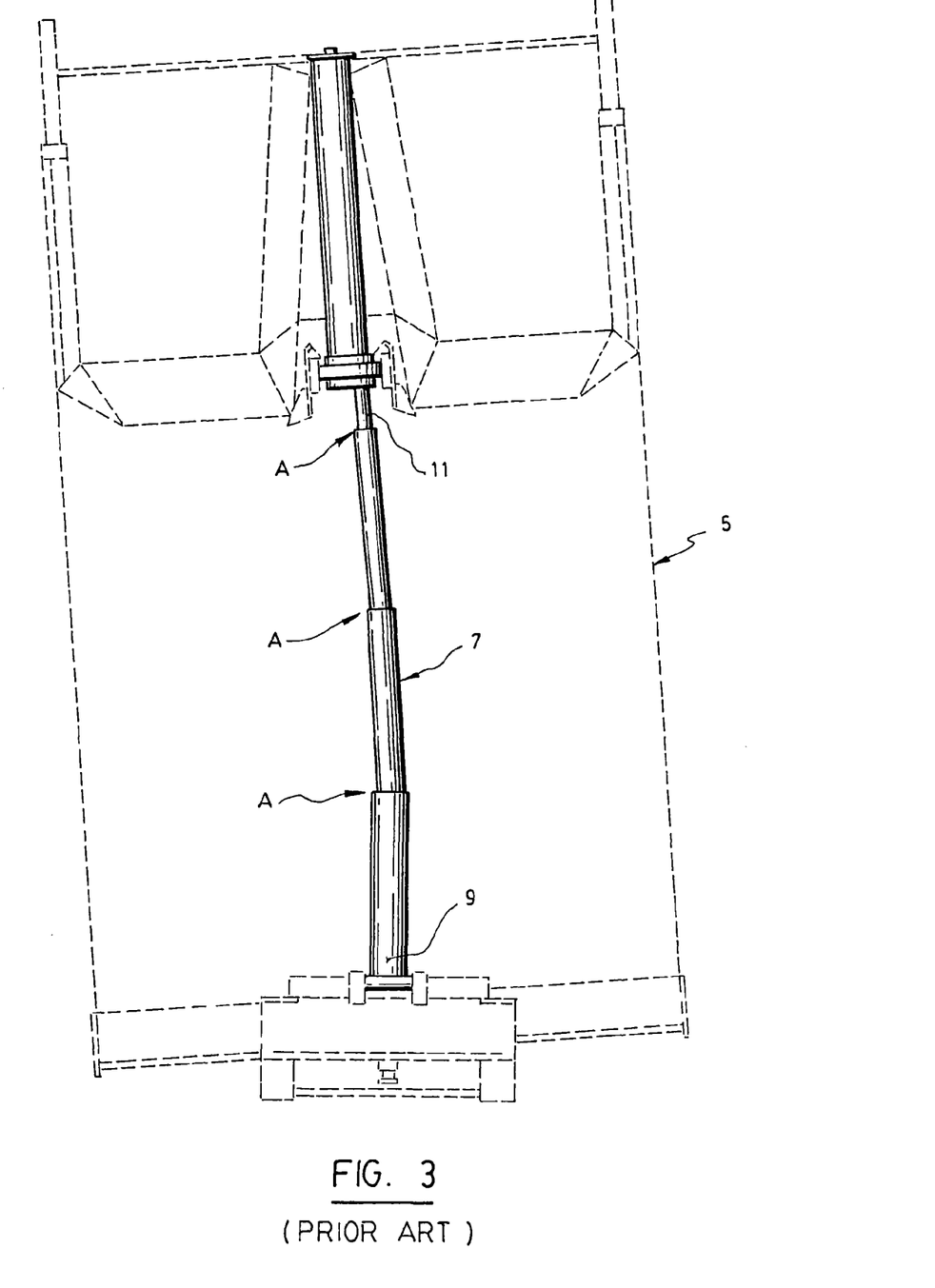
FIG. 3 identified as "PRIOR ART", is a view similar to FIG. 2, but illustrating the body lift cylinder in a fully extended position, said view illustrating once again the deformation to which the cylinder is subjected when the dump body is lifted up.

Illustrations of this problem as it may occur when the body lift cylinder is extended to lift up the dump body, are shown in FIGS. 1 to 3 of the drawings, identified as "PRIOR ART". The letter "A" that appears on these figures, illustrates the places where a pressure or torsion is created due to the deflection of the dump body.

It is well known, especially in trucks having a pivotably mounted dump body, that it is not very often that their users may empty the dump body on a flat surface. Therefore, there is actually a need to improve the way the body lift cylinder is connected to the frame, in order to reduce to a maximum extent the pressure that the cylinder is subject in use, and that may damage the same.

SUMMARY OF THE INVENTION

The object of the present invention is to solve the above-mentioned problem by mounting the body lift cylinder of the dump body onto the frame of the equipment by means of a mobile base, which permits to transfer to said base the tension that is usually applied onto the body lift cylinder, and more specifically the pressure exerted on it when the dump body is lifted up while the frame lies on a surface that is not flat, which is usually the case.

More specifically, the invention as broadly claimed, is directed to an equipment of the type comprising a frame on which is mounted a dump body liftable by means of a body lift cylinder having two opposite ends, a first one of said ends being connected to the frame and the other one of said ends to the dump body in order to lift it up when the cylinder is extended. In accordance with the invention, the first end of the body lift cylinder that is connected to the frame, is mounted on a mobile base which is fixed onto the frame in such a manner as to have some liberty of transversal inclination and thus to allow the cylinder to extend in a constant straight line even if a lateral torsion is applied onto the cylinder by the dump body when said dump body is lifted up.

According to a preferred embodiment of the invention, the mobile base comprises:
- a support comprising a central part devised to receive and hold the first end of the cylinder, and two lateral parts that are opposite to each other and each in the form of a tubular shaft, these shafts being aligned on a same common axis perpendicular to the cylinder;
- a set of two holding sleeves, each of these sleeves being provided with a cylindrical opening in which is inserted one of the shafts of the support in order to retain said support while allowing it to pivot about the common axis of said shafts, said holding sleeves being each provided with two opposite ends transversal to the common axis of the shafts; and
- two rigid holding pieces fixed to the frame of the equipment, these holding pieces being devised and positioned in such a manner as to receive and retain the opposite ends of each of the holding sleeves, while giving them enough liberty to allow the requested transversal pivotment required to allow the body lift cylinder to extend in a constant straight line even when it is subjected to a lateral torsion.

According another preferred embodiment the invention, the mobile base comprises:
- an annular support comprising a central part devised to receive the first end of the cylinder, and a peripheral external part that is convex and of round shape, said annular support being attached in a rigid manner to the first end of the cylinder.
- a set of two plates devised to be attached to each other in a rigid manner, each of said plates comprising a central widened opening of round shape, the central openings of said plates altogether forming, when said plates are attached, a collar that surrounds and retains the peripheral external part of the annular support while letting it free to rotate and tilt, and
- at least on rigid holding piece that is fixed to the frame of the equipment and on which the set of two plates are attached in a rigid manner,
- the round shape of the peripheral external part of the annular support and the collar formed by the two plates of the set of plates once attached to each other allowing the first end of the cylinder to fold and thus allowing the cylinder to extend in a constant straight line even when it is subjected to a lateral torsion.

As can therefore be appreciated, the present invention permits to substantially reduce the torsion applied to the body lift cylinder, in addition to facilitate the movement of the dump body. Indeed, thanks to the mobile base, the body lift cylinder is capable of moving up while being sufficiently mobile to avoid any flexion applied to the extendable parts of the same when said body lift cylinder is extending up.

The invention and its advantages will be better understood upon reading the following non-restrictive description of two preferred embodiments of the invention, made with reference to the accompanying drawings.

DETAILED DESCRIPTION OF THE INVENTION

As previously described and illustrated in FIGS. 1 to 3 identified as "PRIOR ART", the object of the present invention is an equipment such as a truck 1, which comprises a frame 3 on which is mounted a dump body 5 liftable by means of a body lift cylinder 7 having a first end 9 connected to the frame and a second end 11 connected to the dump body to lift it up when the body lift cylinder is extended.

These structural elements are standard and commonly used in this type of equipment. So, they do not need to be disclosed in greater detail.

As a matter of fact, the present invention lies in the way the first end 9 of the body lift cylinder 7 is connected to the frame 3. According to the invention, this first end is mounted on a mobile base which is fixed onto the frame in such a manner as to have some liberty of transversal inclination and thus to allow the cylinder 7 to extend in a constant straight line, even if a lateral torsion is applied onto the cylinder by the dump body 5 when the same is lifted up.

FIGS. 4 to 7c illustrate a first preferred embodiment of the invention, wherein the mobile base is numbered 13. In this first embodiment, the mobile base 13 comprises a support 15 which itself comprises a central part 17 devised to receive and hold the first end 9 of the cylinder. The support 15 also comprises two lateral parts 19 and 21 which are opposite to each other and each in the form of a tubular shaft, said shafts being aligned on a same common axis X perpendicular to the cylinder (see FIG. 5a).

Figure 4:
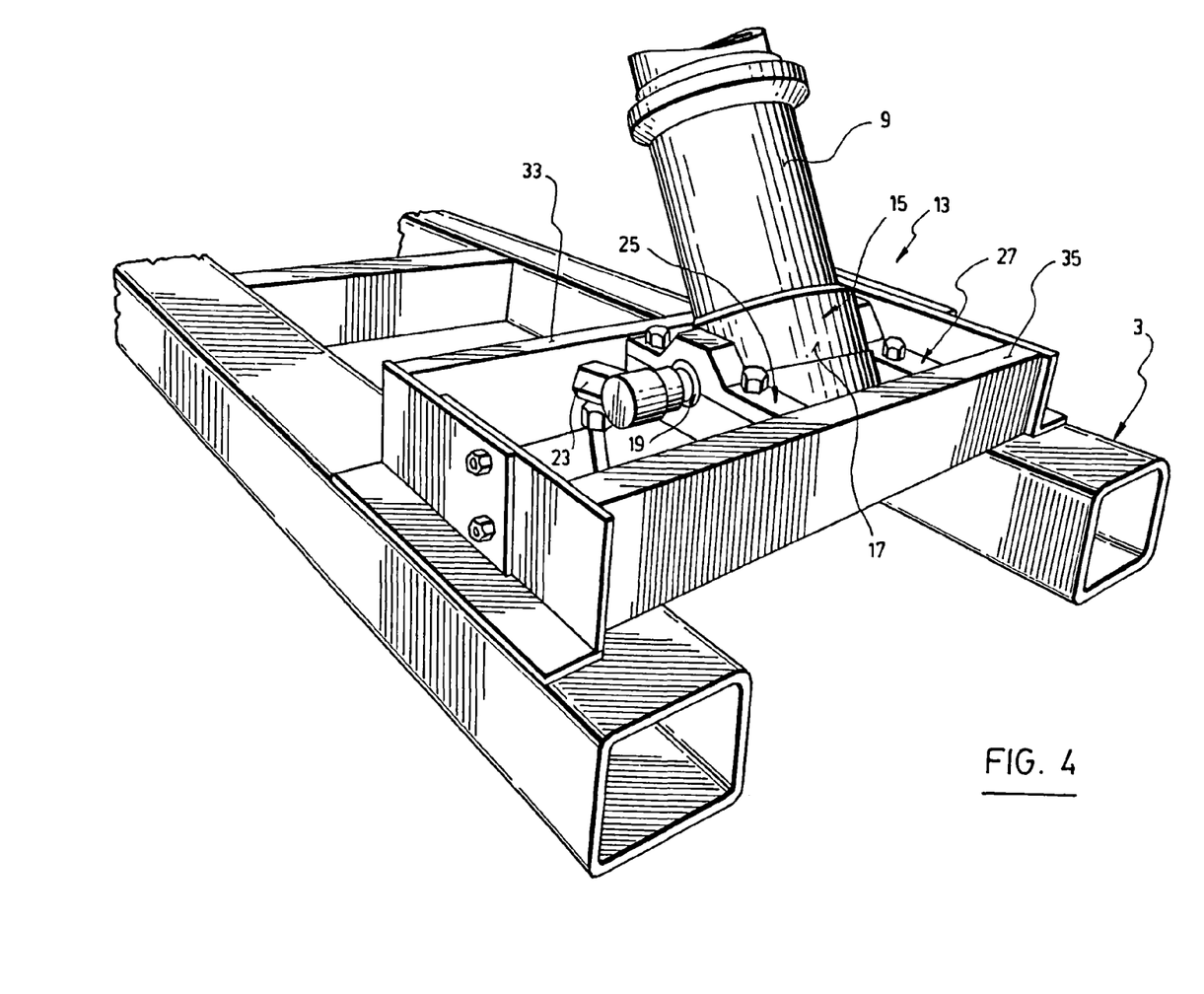
FIG. 4 is a perspective view of a mobile base according to a first preferred embodiment of the invention, which is used to connect the lower end of the body lift cylinder to the frame.
Figure 5A:
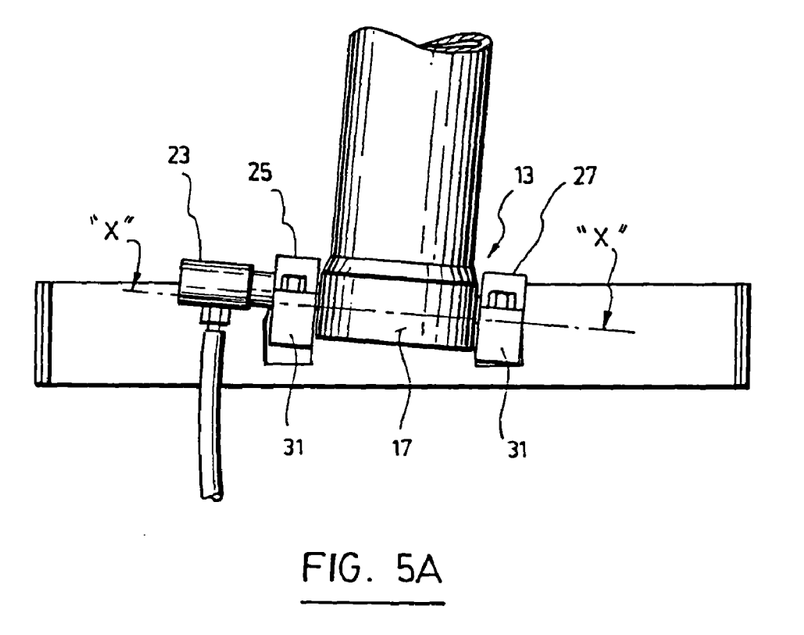
FIGS. 5a and 5b are front elevational views showing the transversal inclination that is given to the body lift cylinder thanks to the mobile base according to the invention.
Figure 5B:
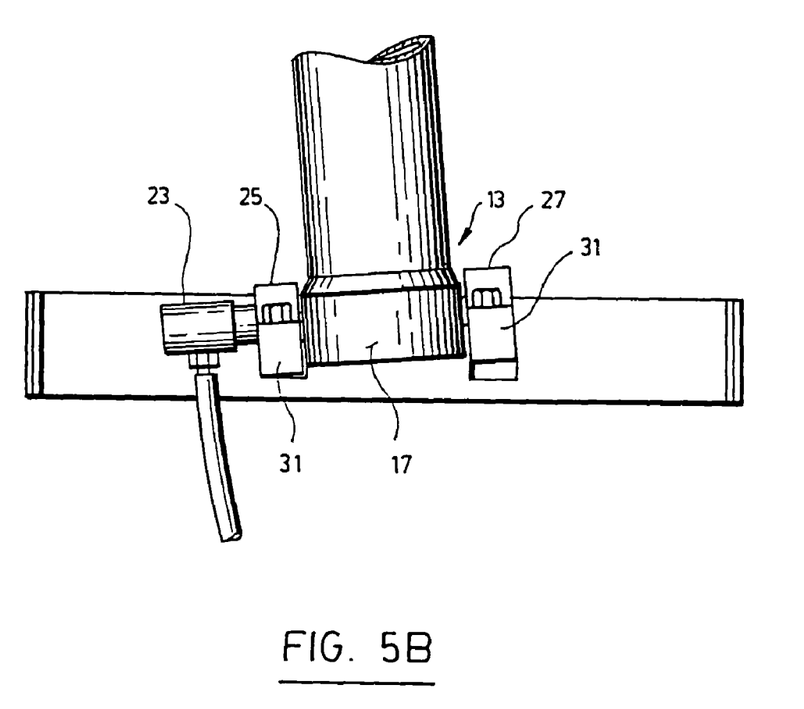
Figure 6:
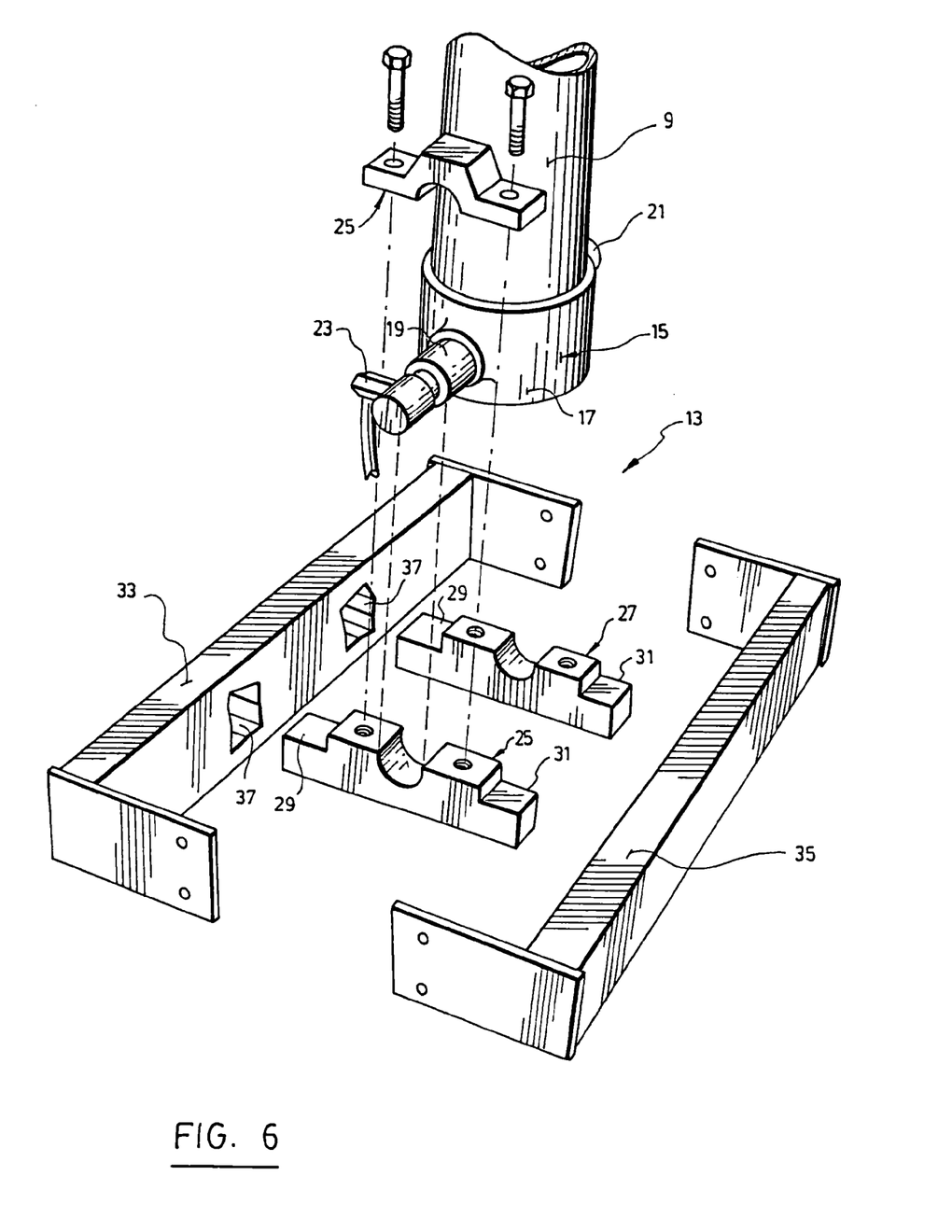
FIG. 6 is an exploded perspective view of the mobile base shown in FIG. 4.

In the particular embodiment shown in FIG. 4 and subsequent, one of the two cylinders, namely the one numbered 39, is provided with a central cavity intended to let pass a supply system 23 to activate the body lift cylinder 7. It can however be understood that this system 23 could be positioned in a different manner, depending on the needs and/or structure of the equipment.

The mobile base 13 also comprises a set of two holding sleeves 25 and 27, each made of two parts, namely an upper part and a lower part, which together define a cylindrical opening in which is inserted one of the lateral shafts 19 or 21 of the support in order to retain this support, while allowing it to pivot about the common axis X of the shafts.

As aforesaid, in the embodiment shown in FIGS. 4 to 7c, each of the holding sleeves is made of two parts, each provided with a central recess, which can be bolted onto each other. Such facilitates the installation of the body lift cylinder onto the equipment.

As is also illustrated, each of the sleeves 25 and 27 is provided with two opposite ends 29 and 31 that are transversal to the common axis X of the cylinders 19 and 21.

In the embodiment shown in FIGS. 4 to 7c, the opposite ends 29 and 31 of the holding sleeves 25 and 27, are of a square cross-section.

Figure 8:
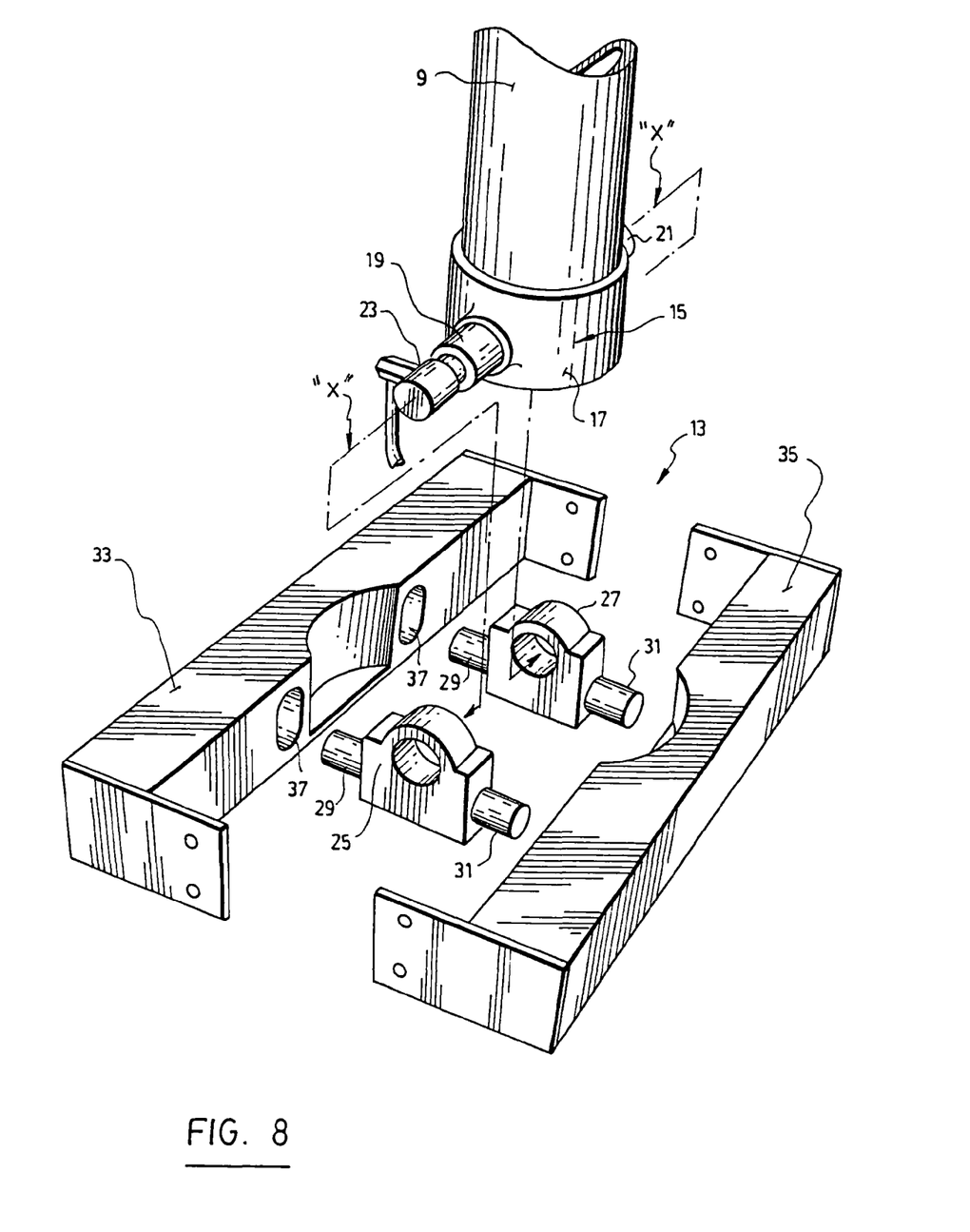
FIG. 8 is a view similar to FIG. 6, showing a variant of the mobile base shown in this FIG. 6.
Figure 9A:
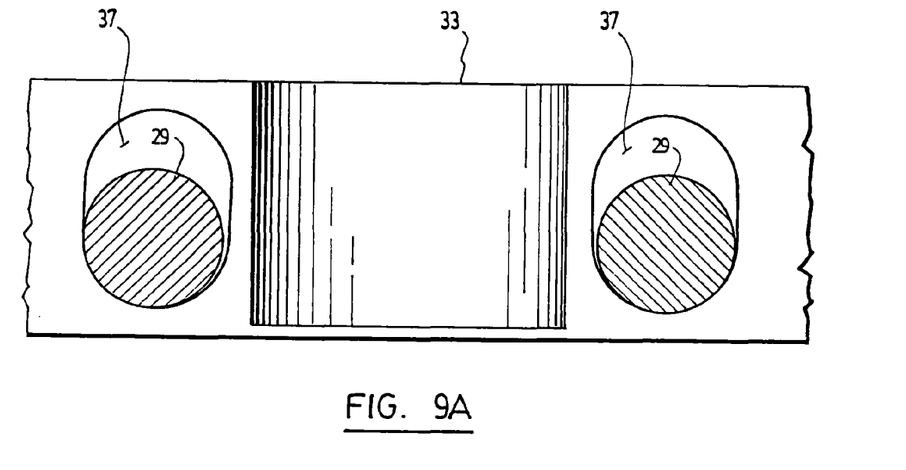
FIGS. 9a, 9b, and 9c are views similar to FIGS. 7a, 7b and 7c, which illustrate the liberty that is left to the holding sleeves of the mobile base illustrated in FIG. 8.
Figure 9B:
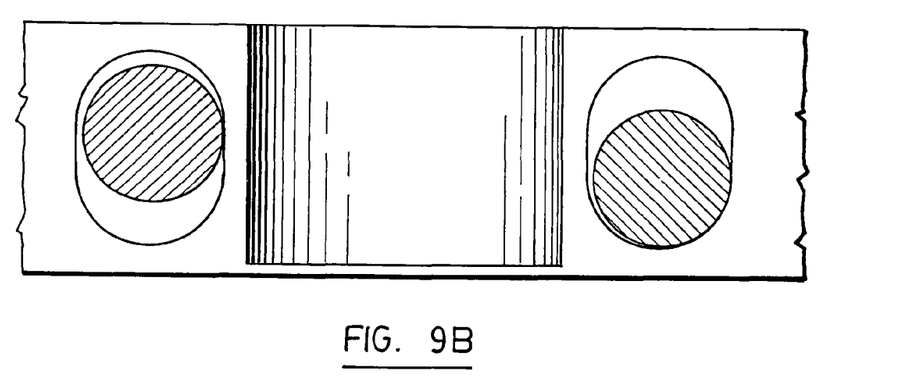
Figure 9C:
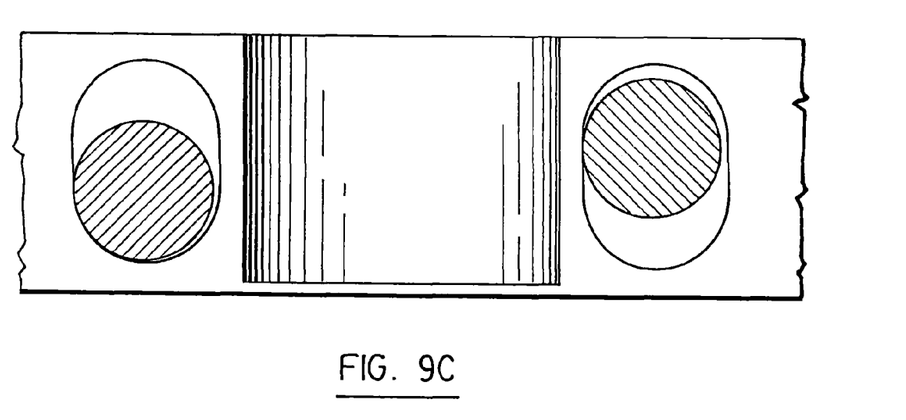

In another preferred embodiment of the invention shown in FIGS. 8 to 9c, the sleeves 25 and 27 are each made of only one single piece, and have their opposite ends cylindrical in shape.

The mobile base 13 according to the invention further comprises a set of rigid holding pieces 33 and 35 fixed to the frame 3 of the equipment. As is clearly shown in FIGS. 4, 6 and 8, these holding pieces 33 and 35 are devised and fixed in such a manner as to receive and retain the opposite ends 29 and 31 of the holding sleeves 25 and 27. For this purpose, the holding pieces 33 and 35 are provided with openings 37 in which the ends 29 and 31 of the sleeves 25 and 27 are inserted and maintained with some slack.

Figure 7A:
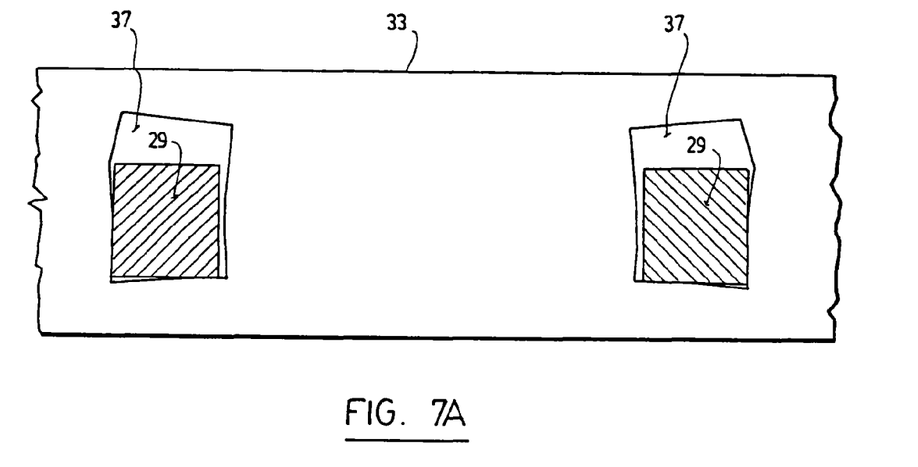
FIGS. 7a, 7b and 7c are front elevational views showing the way the holding sleeves of the mobile base can move within openings provided for this purpose in the rigid holding pieces fixed to the frame of the equipment.
Figure 7B:
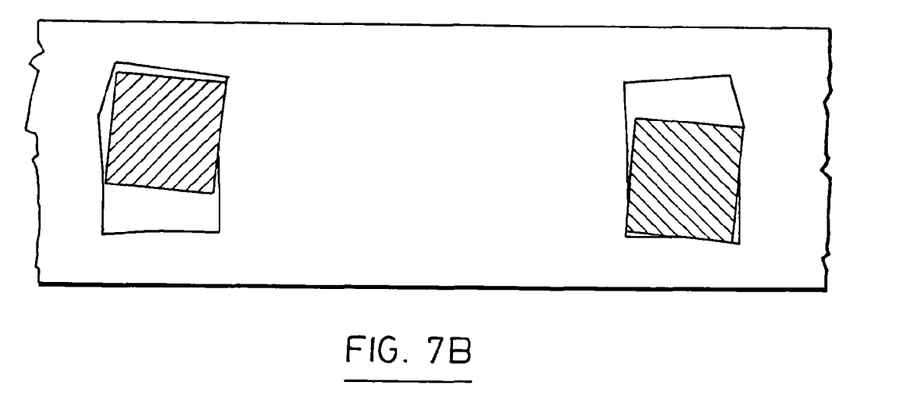
Figure 7C:
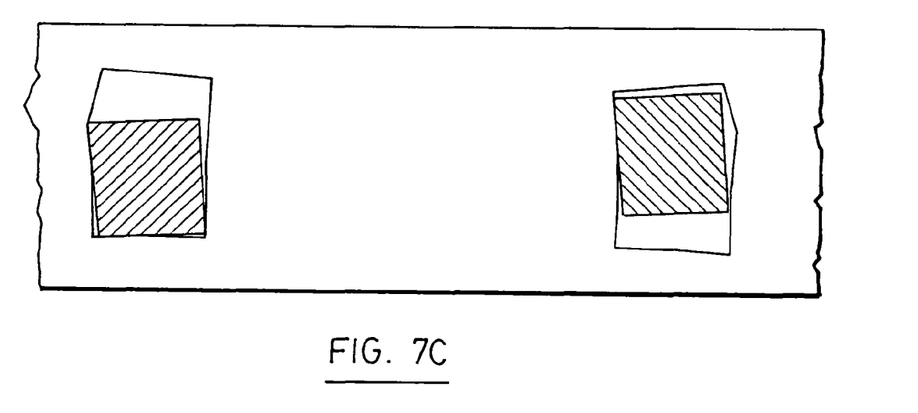

In the first embodiment of the invention shown in FIGS. 4 to 7c, the openings 37 have a generally rectangular shape, but with inclined edges devised to receive the opposite ends 29 and 31 of the sleeves having a square shape, and give them enough slack for a transversal inclination, as is shown in greater detail in FIGS. 7a to 7c.

In the other embodiment of the invention shown in FIGS. 8 to 9c, the openings 37 are of oblong shape in order to receive the opposite ends 29 and 31 of cylindrical shape of the sleeves 25 and 27, and to give them enough slack to allow transversal inclination of the mobile base. This is shown in greater detail in FIGS. 9a to 9c.

FIGS. 13 and 14a to 14c illustrate a second preferred embodiment of the invention. In this second embodiment, the mobile base which is numbered 13', comprises an annular support 15' provided with a central part 17' that is devised to receive the first end 9 of the cylinder 7. This annular support 15' is also provided with a peripheral external part 19' that is convex and of a round shape. The annular support 15' is attached in a rigid manner to the first end 9' of the cylinder 7' by means of attachment means such as bolts 21' insertable into holes 25' made in a bottom wall 23' extending under the central part 17', in such a manner as to be screwable into holes 27' provided for this purpose under the bottom surface of the first end 9' of the cylinder 7.

Figure 13:
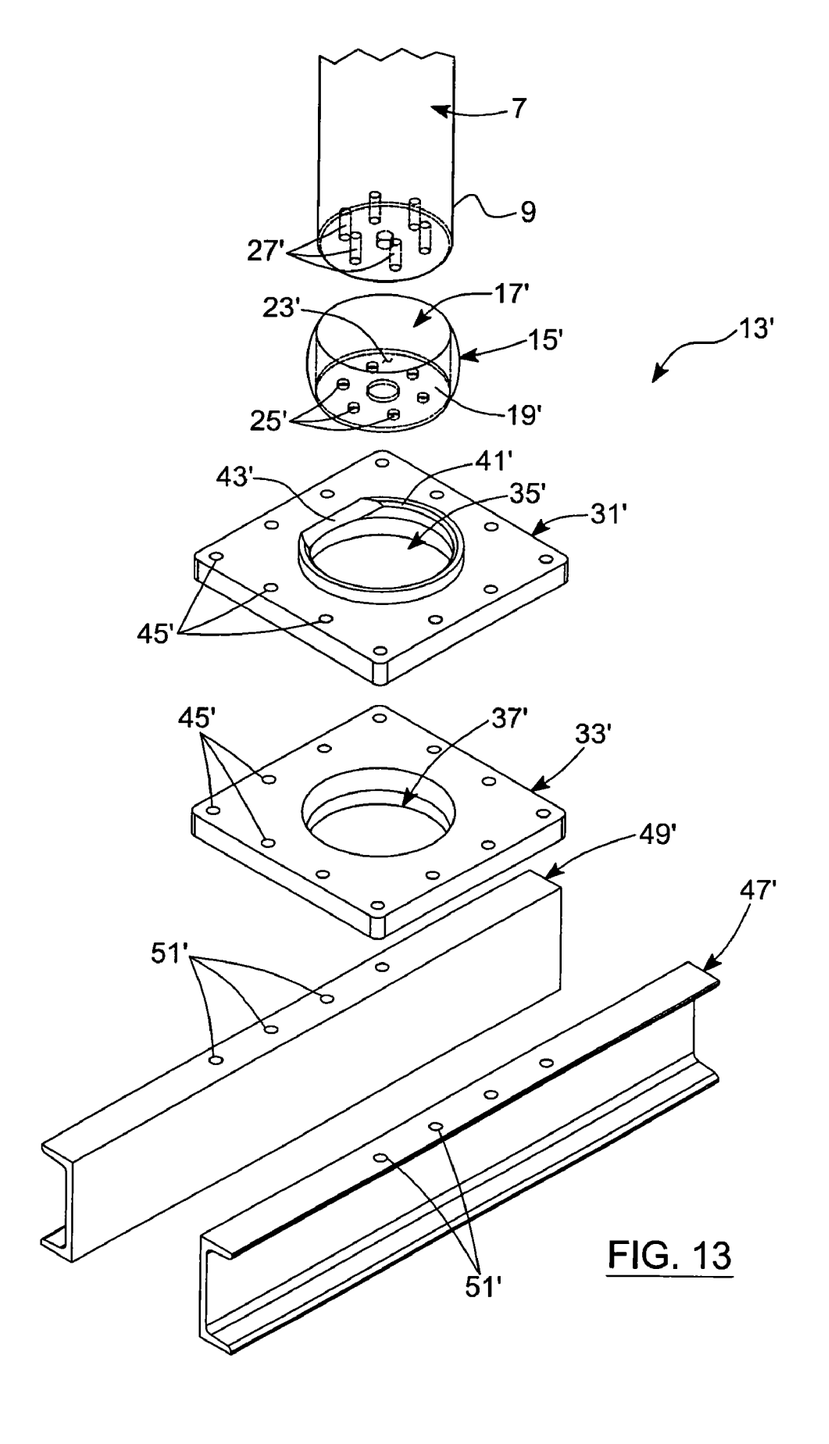
FIG. 13 is an exploded perspective view of a mobile base according to another preferred embodiment of the invention.

It is worth noting that the bottom wall 23' may be provided with a central opening to allow the supply system of the body lift cylinder 7 to pass through if it has to fit at the bottom of this cylinder 7.

Of course, any other attachment means suitable to connect the cylinder 7 into the central part 17 of the annular support 15 could be used, such as for example a welding of the annular support directly onto the cylinder.

Figure 14A:
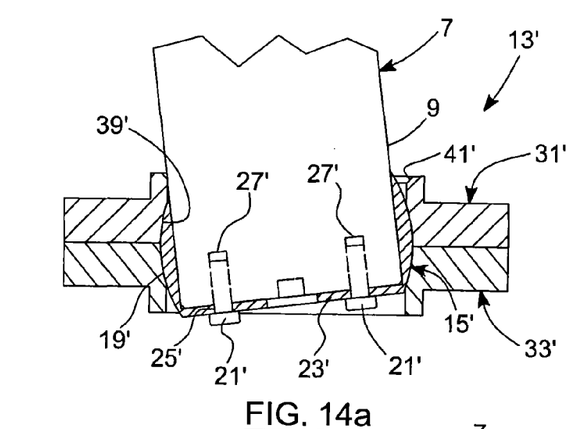
FIGS. 14a, 14b and 14c are front elevational views in cross section of the mobile base shown in FIG. 13, but in an assembled form, said Figures illustrating the liberty left to the body lift cylinder.
Figure 14B:
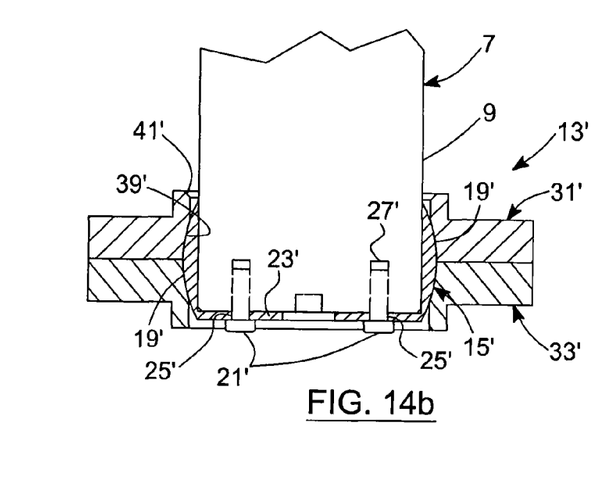
Figure 14C:
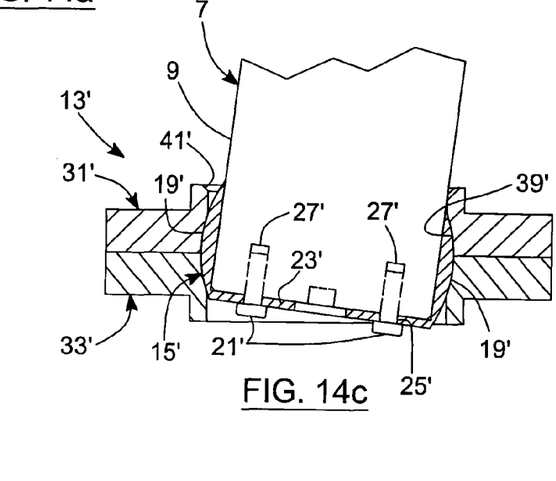

The mobile base 13' shown in FIGS. 13 and 14a to 14c, also comprises a set of two plates 31' and 33' devised to be attached to each other in a rigid manner, preferably by means of bolts 21' insertable into holes 45' provided for this purpose. The plates 31' and 33' are each provided with a central widened opening of a round shape, respectively numbered 35' et 37'. As is shown in FIGS. 14a to 14c when the plates 31' and 33' are attached to each other, the openings 35' and 37' together form a collar 39' that surrounds and retains the peripheral external part 19' of the annular support 15' while leaving it free to rotate and tilt. This is actually obtained thanks to the respective round shapes of the peripheral external part 19' of the annular support and of the central openings 35 and 37.

Of course, it will be understood that the upper plate 31' must be installed on the cylinder 7 before the first end 9 of this cylinder is inserted and attached to the annular support 15 and the other plate 33 be positioned and attached to the plate 31'. The two plates 31' and 33' must indeed surround the annular support 15' once this support is attached to the cylinder 7. However, it will be understood that the plate 31' could also be slid onto the length of the cylinder from the top of the same, before this cylinder is connected to the dump, if such is possible and desired.

Preferably, the central opening 35' of the plate 31' from which the cylinder 7 extends toward the dump body, has an upper edge 41' that is externally bevelled, in order to give some freedom of orientation to the cylinder 7. A recess 43' can also be made into this upper edge 41', in order to further increase the freedom of orientation of the cylinder, if need be.

The mobile base 13' of the equipment of the second preferred embodiment of the invention further comprises at least one, and preferably two, rigid holding pieces 47' and 49', which are fixed to the frame of the equipment, and on which the set of two plates 31' and 33' are attached in a rigid manner by means of bolts insertable into holes 51'. Of course, any other attachment means could also be used, provided that they provide the required rigidity.

As can be seen in FIGS. 14a to 14c, the round shape of the peripheral external part 19' of the annular support 15' and the shape of the collar 39' formed by the plates 31' and 33', once these plates have been attached to each other, allow the cylinder 7 to fold and the cylinder to extend in a constant straight line even if it is subject to a lateral torsion.

As can therefore be appreciated in view of the structures specifically disclosed hereinabove, the mobile bases 13 and 13' according to the invention, both provide an opportunity lateral inclination of the body lift cylinder 7 with some slack, when the same is moving up. Thus, the cylinder 7 has the capacity of moving up while being sufficiently laterally mobile to avoid flexion of its components when the cylinder is moving up.

As a result, this allows the body lift cylinder 7 to extend in a constant straight lien, even in the case where a lateral torsion is applied onto the cylinder by the dump body because of the positioning of the frame and/or the positioning of the equipment comprising this frame when said dump body is lifted up.

Figure 10:
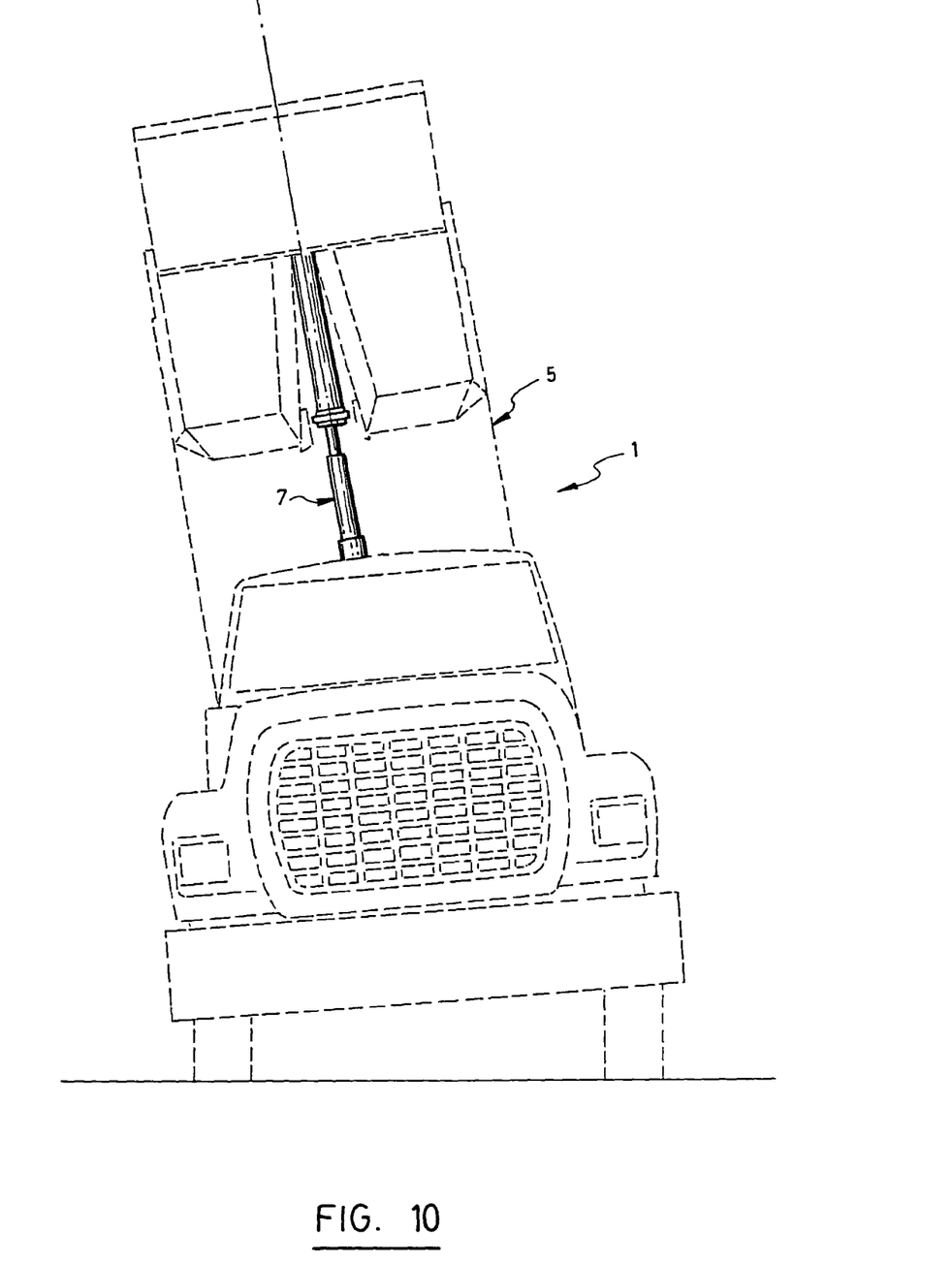
FIGS. 10, 11 and 12 are views similar to those of FIGS. 1, 2 and 3, but showing the result achieved with the mobile base according to the invention.
Figure 11:
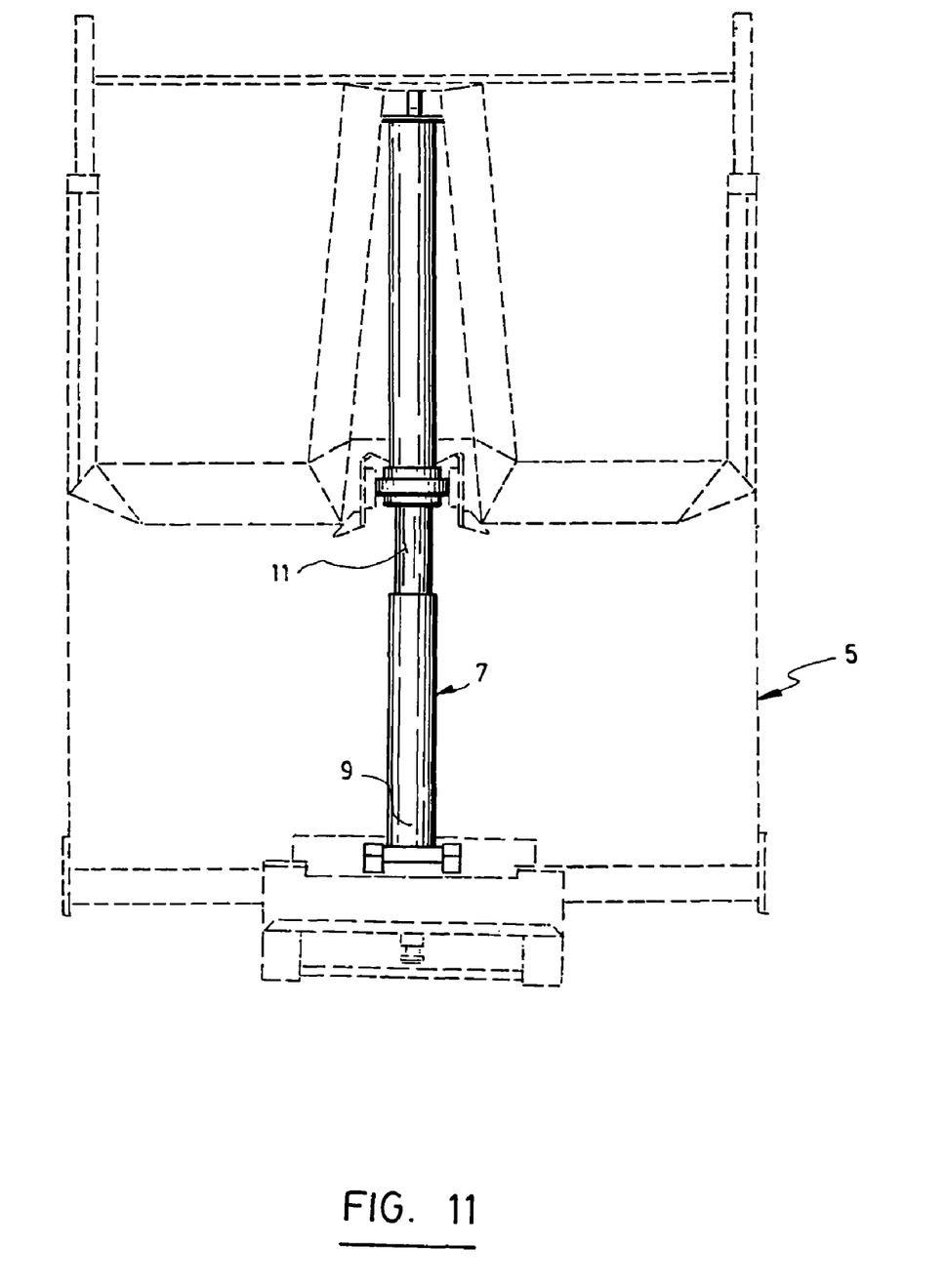
Figure 12:
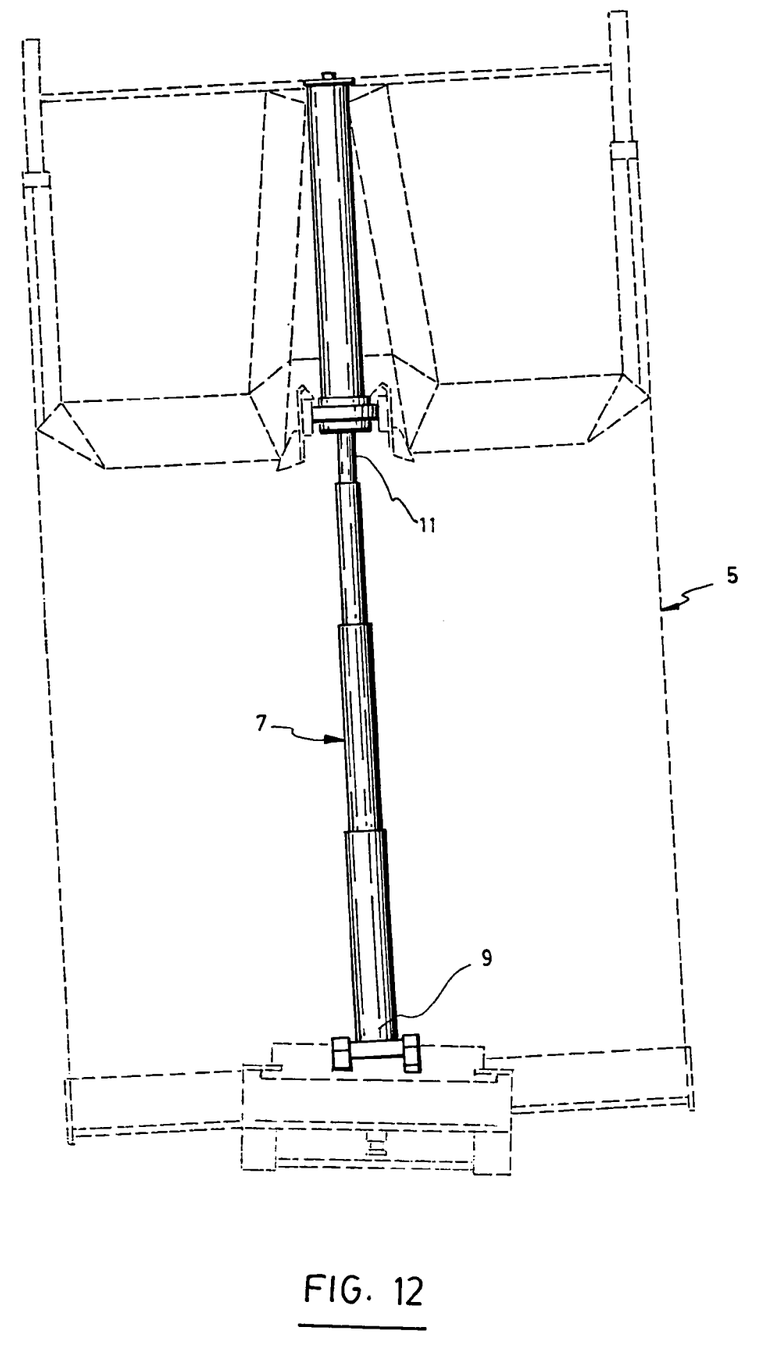

The good result disclosed hereinabove, namely the possibility for the body lift cylinder to extend in a constant straight line whatever be the position of the frame or equipment on which it is attached, is illustrated in FIGS. 10 to 12 which are similar to FIGS. 1 to 3 but which clearly show that there is no more torsion onto the cylinder 7.

Of course, modifications could be made to the preferred embodiments that have been disclosed hereinabove with reference to the drawings, without departing from the scope of the invention as defined in the appended claims.

The invention claimed is:

1. An equipment of the type comprising a frame on which is mounted a dump body liftable by means of a body lift cylinder located in the middle of the frame and having two opposite ends, a first one of said ends being connected to the frame and the other one of said ends connected to the dump body in order to lift the dump body up when the cylinder is extended, the first end of the cylinder connected to the frame is mounted on a mobile base fixed onto the frame to permit transversal inclination and thus to allow the cylinder to extend in a constant straight line even if a lateral torsion is applied onto the cylinder by the dump body when said dump body is lifted up, the mobile base having a support comprising a central part devised to receive and hold the first end of the cylinder, and two lateral parts that are opposite to each other and each in the form of a tubular shaft, said shafts being aligned on a common axis perpendicular to the cylinder; a set of two holding sleeves, each of said sleeves being provided with a cylindrical opening in which is inserted one of the shafts of the support in order to retain said support while allowing it to pivot about the common axis of said shafts, said holding sleeves being each provided with two opposite ends transverse to the common axis of the shafts, and two rigid holding pieces fixed to the frame of the equipment, said holding pieces being adapted and positioned as to receive and retain the opposite ends of each of the holding sleeves, while giving them enough liberty to allow the requested transversal pivotment required to allow the body lift cylinder to extend in a constant straight line even when it is subjected to a lateral torsion.

2. The equipment of claim 1, wherein: each of the holding sleeves comprises upper and lower parts, said lower part being provided with a central recess to receive one of the shafts of the support, and with two opposite sides each of a square cross-section, said opposite sides forming the opposite transverse ends of the corresponding holding sleeve, the upper part of each of said sleeves being also provided with a central recess and being fixed in a removable manner to the lower part of said sleeves in order to form with it a cylindrical opening to receive the corresponding tubular shaft of the support; and the rigid holding pieces are provided with rectangular openings with inclined edges devised to receive the opposite ends of the sleeves and give them some play to allow the transverse inclination of the mobile base whenever necessary.

3. The equipment of claim 1, wherein said equipment is a truck on which the dump body is pivotably mounted.

4. The equipment of claim 2, wherein said equipment is a truck on which the dump body is pivotably mounted.

* * * * *